(12) United States Patent
Pai

(10) Patent No.: US 9,055,837 B2
(45) Date of Patent: Jun. 16, 2015

(54) GRILLING DEVICE

(75) Inventor: Nai-chiang Pai, Taipei (TW)

(73) Assignee: TSANN KUEN (ZHANGZHOU) ENTERPRISE CO., LTD., Zhangzhou (CN)

( * ) Notice: Subject to any disclaimer, the term of this patent is extended or adjusted under 35 U.S.C. 154(b) by 513 days.

(21) Appl. No.: 13/213,601

(22) Filed: Aug. 19, 2011

(65) Prior Publication Data

US 2012/0042787 A1    Feb. 23, 2012

(30) Foreign Application Priority Data

Aug. 19, 2010  (CN) ...................... 2010 2 0295669 U

(51) Int. Cl.
*A47J 37/06*    (2006.01)

(52) U.S. Cl.
CPC .................................. *A47J 37/0611* (2013.01)

(58) Field of Classification Search
CPC ....... A47J 37/0611; A47J 37/06; A21B 5/023
USPC ............ 99/372, 374, 375, 376, 377, 378, 379
See application file for complete search history.

(56) References Cited

U.S. PATENT DOCUMENTS

| 264,867 | A | * | 9/1882 | Ege | .................................. | 99/375 |
| 3,010,383 | A | * | 11/1961 | Greene | ........................... | 99/332 |
| 5,363,748 | A | * | 11/1994 | Boehm et al. | ................... | 99/372 |
| 5,845,562 | A | * | 12/1998 | Deni et al. | ....................... | 99/375 |
| 6,026,736 | A | * | 2/2000 | Turner | ............................ | 99/349 |
| 6,269,738 | B1 | * | 8/2001 | Huang | ............................ | 99/375 |

* cited by examiner

*Primary Examiner* — Reginald L Alexander
(74) *Attorney, Agent, or Firm* — Rabin & Berdo, P.C.

(57) ABSTRACT

A grilling device comprising an upper shell and a lower shell, an upper pan disposed under the bottom of the upper shell, and a lower pan disposed under the top of the lower shell, wherein the top surface of the lower pan is slant from the middle to both the front side and the rear sides, and the bottom surface of the upper pan is corresponding to the shape of the top surface of the lower pan. the oil can be discharged both from the front side and the rear side, thus the oils can be discharged more quickly; food with arc shape can be cooked because the pan is with arc shape too; the spice box can add the taste to the food; in cooking vegetable, water can be put in the spice box to maintain the water content of the vegetable, or maintain the other food not be too dry.

10 Claims, 1 Drawing Sheet

GRILLING DEVICE

FIELD OF THE INVENTION

The present invention relates to a grilling device, particularly, to a grilling device with double-arc pans.

BACKGROUND OF THE INVENTION

Grilling devices in the market comprise an upper shell and a lower shell, an upper pan disposed under the bottom of the upper shell, and a lower pan disposed under the top of the lower shell. Because grilling devices are normally used for cooking food with oil (e.g. meet), so much oil will be produced in grilling, this oil must be discharged out the pans, or else it will affect the taste of the food. Normally the grilling device have an oil-discharging opening, and a oil box is disposed under the front portion of the pan to collect the oil from the oil-discharging opening. The pans of the grilling device are plane, or a little slant so that the oil can flow into the box oil.

But the grill has the following disadvantages: firstly, because the oil is discharged from one side of the pan, the flowing distance is too long, and the discharging speed is slow, so the oil is maintained in the grilling device too long, this affect the taste of the grilled food, secondly, because the grilling surface is plane, when food with arc shape are cooked, e.g. eggplants, ribs, different portions of the food will have different distance to the pan, so different portions of the food will be heated dis-uniformly, thirdly, when vegetable is cooked, the vegetable is easy to be dehydrated, thus affect the taste of the vegetable.

SUMMARY OF THE INVENTION

The primary object of the present invention is to provide a grilling device with double-arc pans to obviate the disadvantages in background.

The object of the present invention is achieved by providing:

A grilling device comprising an upper shell and a lower shell, an upper pan disposed under the bottom of the upper shell, and a lower pan disposed under the top of the lower shell, wherein the top surface of the lower pan is slant from the middle to both the front side and the rear sides, and the bottom surface of the upper pan is corresponding to the shape of the top surface of the lower pan.

In a preferred embodiment of the present invention, the top surface of said lower pan has slant surfaces or arc surfaces on both front portion and rear portion symmetrically.

In a preferred embodiment of the present invention, said surface of the lower pan is smooth surface or wave surface with ribs.

In a preferred embodiment of the present invention, said top surface of the lower pan is an arc surface symmetrically from front side to rear side, from the the front side to the rear side is a continue arc shape or not a continue arc shape.

In a preferred embodiment of the present invention, said top surface of the lower pan is a continue arc surface, and the radius (R) of the arc is 250~500 mm, and the width from front side to rear side is 100 mm~450 mm. in the above width range, if the radian <R250, then the food is easy to be slide from the pan; if the radian >R500, the pan will be too even and the oil is hard to be discharged.

In a preferred embodiment of the present invention, the grilling device of the present invention further comprises an oil box for collecting the oil discharged from the pan.

In a preferred embodiment of the present invention, a spice box is disposed between the upper pan and the lower pan.

In a preferred embodiment of the present invention, said spice box is disposed in the middle of the pan.

Advantages of the present invention: the oil can be discharged both from the front side and the rear side, thus two different foods can be disposed both in the front portion and the rear portion of the pan in a time, and the oils from the two portions will not mixed in the pan; food with arc shape can be cooked because the pan is with arc shape too; the spice box can add the taste to the food; in cooking vegetable, water can be put in the spice box to maintain the water content of the vegetable, and maintain the other food not too dry. The present invention has oil box to collect the discharged oil from both sides of the pan, thus can maintain a cleanly cooking condition.

DETAILED DESCRIPTION OF THE PREFERRED EMBODIMENT

Figure 1:
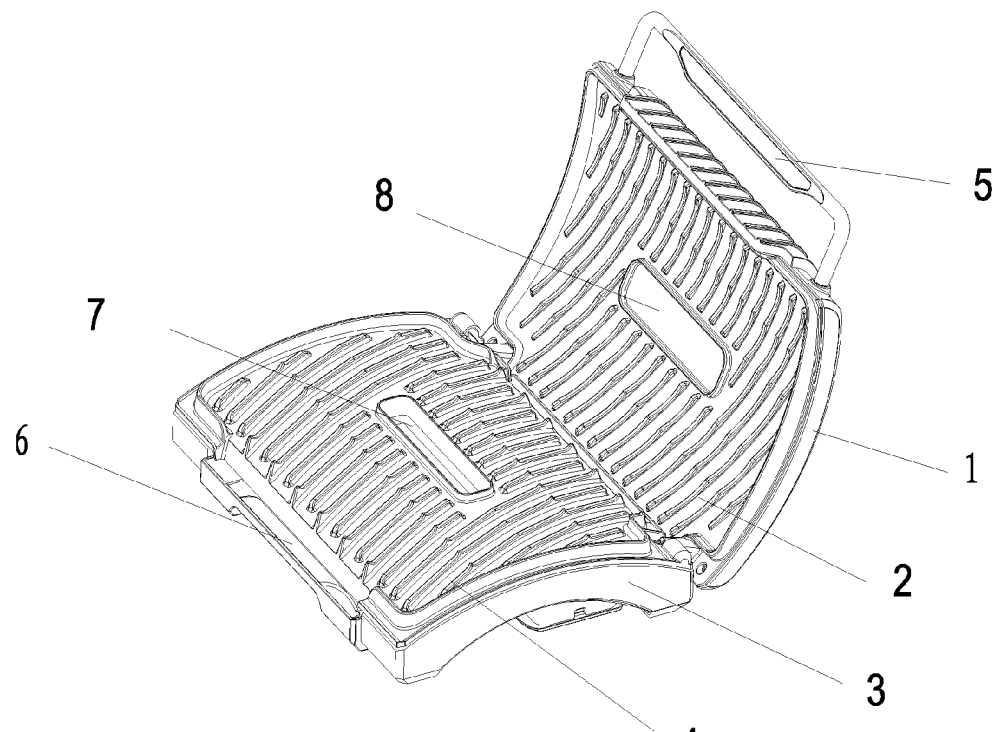
FIG. 1 is a perspective view of the grilling device of the present invention.
Figure 2:
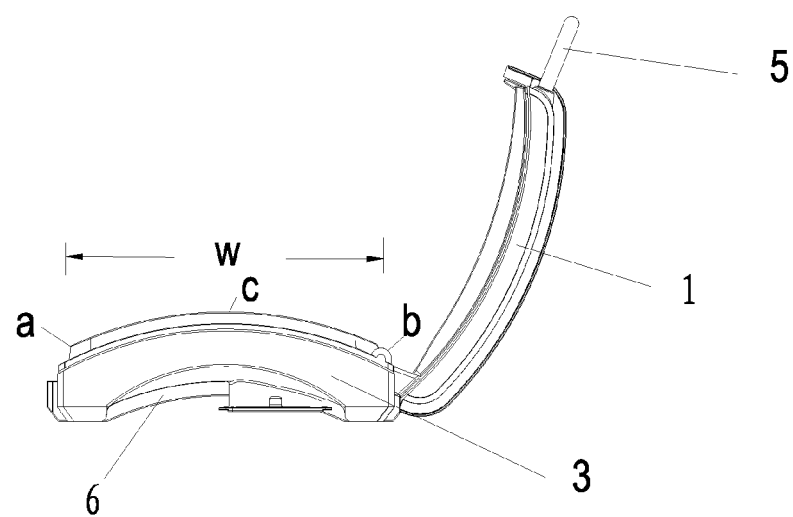
FIG. 2 is a side view of the grilling device of the present invention.

Referring to FIG. 1 and FIG. 2, a grilling device comprise an upper shell 1 and a lower shell 3, an upper pan 2 disposed under the bottom of the upper shell 1, and a lower pan 4 disposed under the top of the lower shell 3, the rear sides of the upper shell 1 and the lower shell 3 are connected by pivots to form rotating connection. A handle 5 is mounted on the upper shell 1.

The top surface of the lower pan 4 is a double-arc surface symmetrically from front side to rear side, and the surface is tiled from the middle to both front side to rear side. Referring to FIG. 2, the front portion of the surface has an arc ac, the rear portion of the surface has an arc cb, and the arc ac and the arc cb form a continue bigger arc acb. In this embodiment, the radius of the arc acb is 300 mm, the width of the pan from front side to rear side (i.e. point a and point b in FIG. 2) is 300 mm. referring to FIG. 1, the surface of the lower pan 4 is a wave surface with ribs. And the bottom surface of the upper pan 2 is corresponding to the top surface of the lower pan 4.

A double-arc oil box 6 which is wider than the width of the lower pan is disposed in the bottom of the lower shell to collect the oil discharged from both front side and the rear side. Certainly, it also can put an oil box in the front side and another oil box in the rear side of the lower shell 3 to collect the oil discharged from both the front side and the rear side of the lower pan.

A spice box is disposed between the upper pan and the lower pan, which comprise a box body 7 in the lower pan 3 and a box cover 8 in the upper pan 1. in this embodiment, the spice box is long-shaped, and is disposed from left side to the right side in the middle of the pans, which also is the top. Spice can be put in the spice box when cooking meet to add the taste of the meet through evaporate and being absorbed by food; in cooking vegetable, water can be put in the spice box to maintain the water content of the vegetable and keep it not too dry.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with detailed description, but rather by the claims appended hereto.

What is claimed is:

1. A grilling device comprising:
an upper shell;
a lower shell;
an upper pan disposed under a bottom of the upper shell;
a lower pan disposed above a top of the lower shell,
wherein a top surface of the lower pan is, from a middle to both front and rear sides of the lower pan, one of a continuously slanted surface that is slanted continuously downward from the middle to the front side and slanted continuously downward from the middle to the rear side, or a continuously arced surface that is arced continuously downward from the middle to the front side and arced continuously downward from the middle to the rear side, the one slanted surface or arced surface being symmetrical about the middle, the one slanted surface or arced surface being a smooth surface or a wave surface with ribs, and a bottom surface of the upper pan corresponds to a shape of the top surface of the lower pan; and
an oil box having a width greater than a width of the lower pan, the oil box collecting oil discharged from both the front side and the rear side.

2. The grilling device according to claim 1, wherein said top surface of the lower pan is the arced surface, and a radius of an arc is 250 mm~500 mm, and a width from the front side to the rear side is 100 mm~450 mm.

3. The grilling device according to claim 1, wherein a spice box is disposed between the upper pan and the lower pan.

4. The grilling device according to claim 3, wherein said spice box is disposed in a middle of the upper and lower pans.

5. The grilling device according to claim 1, wherein the top surface of the lower pan is a topmost surface of the lower pan.

6. A grilling device comprising:
an upper shell;
a lower shell;
an upper pan disposed under a bottom of the upper shell;
a lower pan disposed above a top of the lower shell,
wherein a top surface of the lower pan is, from a middle to both front and rear sides of the lower pan, one of a continuously slanted surface that is slanted continuously downward from the middle to the front side and slanted continuously downward from the middle to the rear side, or a continuously arced surface that is arced continuously downward from the middle to the front side and arced continuously downward from the middle to the rear side, the one slanted surface or arced surface being symmetrical about the middle, the one slanted surface or arced surface being a smooth surface or a wave surface with ribs, and a bottom surface of the upper pan corresponds to a shape of the top surface of the lower pan; and
oil boxes including a first oil box at the front side and a second oil box at the rear side, the first and second oil boxes collecting oil discharged from both the front side and the rear side.

7. The grilling device according to claim 6, wherein a spice box is disposed between the upper pan and the lower pan.

8. The grilling device according to claim 7, wherein said spice box is disposed in a middle of the upper and lower pans.

9. The grilling device according to claim 6, wherein said top surface of the lower pan is the arced surface, and a radius of an arc is 250 mm~500 mm, and a width from the front side to the rear side is 100 mm~450 mm.

10. The grilling device according to claim 6, wherein the top surface of the lower pan is a topmost surface of the lower pan.

\* \* \* \* \*